United States Patent
Li

(10) Patent No.: US 7,616,530 B2
(45) Date of Patent: Nov. 10, 2009

(54) METHOD FOR CHANGING ACCESS SPEED OF AN OPTICAL DISK DRIVE

(75) Inventor: Chin-Ping Li, Miao-Li (TW)

(73) Assignee: Micro-Star Int'l. Co., Ltd., Jung-He (TW)

( * ) Notice: Subject to any disclaimer, the term of this patent is extended or adjusted under 35 U.S.C. 154(b) by 553 days.

(21) Appl. No.: 10/680,258

(22) Filed: Oct. 8, 2003

(65) Prior Publication Data

US 2005/0078569 A1    Apr. 14, 2005

(51) Int. Cl.
    *G11B 7/00* (2006.01)
(52) U.S. Cl. .................... 369/30.36; 369/53.3
(58) Field of Classification Search .............. None
    See application file for complete search history.

(56) References Cited

U.S. PATENT DOCUMENTS

| | | | |
|---|---|---|---|
| 4,355,365 A * | 10/1982 | McCracken et al. | 377/2 |
| 6,493,300 B2 * | 12/2002 | Failer | 369/53.12 |
| 6,512,725 B2 | 1/2003 | Chuang | |
| 6,600,708 B1 * | 7/2003 | Kuo | 369/53.22 |
| 6,643,240 B2 * | 11/2003 | Chen | 369/53.3 |
| 6,909,675 B2 * | 6/2005 | Liu | 369/30.15 |
| 2002/0048245 A1 * | 4/2002 | Hsu | 369/53.37 |
| 2003/0007429 A1 | 1/2003 | Cheng | |

FOREIGN PATENT DOCUMENTS

JP          55150150 A    * 11/1980    ............ 360/61

OTHER PUBLICATIONS

Nilson et al, Electric Circuits, 6th Edition, 1999, pp. 286-288.*

* cited by examiner

*Primary Examiner*—Joseph H Feild
*Assistant Examiner*—Christopher R Lamb

(57) ABSTRACT

Method for changing access speed of an optical disk drive, which is used to switch the optical disk drive with different access speeds, to provide the optimal mode for data access. The method places an RC circuit between the electrical circuits and one of the buttons of the disk drive. Pressing the control button varies the input voltage of the control circuit and the control circuit changes the work speed of the optical disk drive motor.

4 Claims, 5 Drawing Sheets

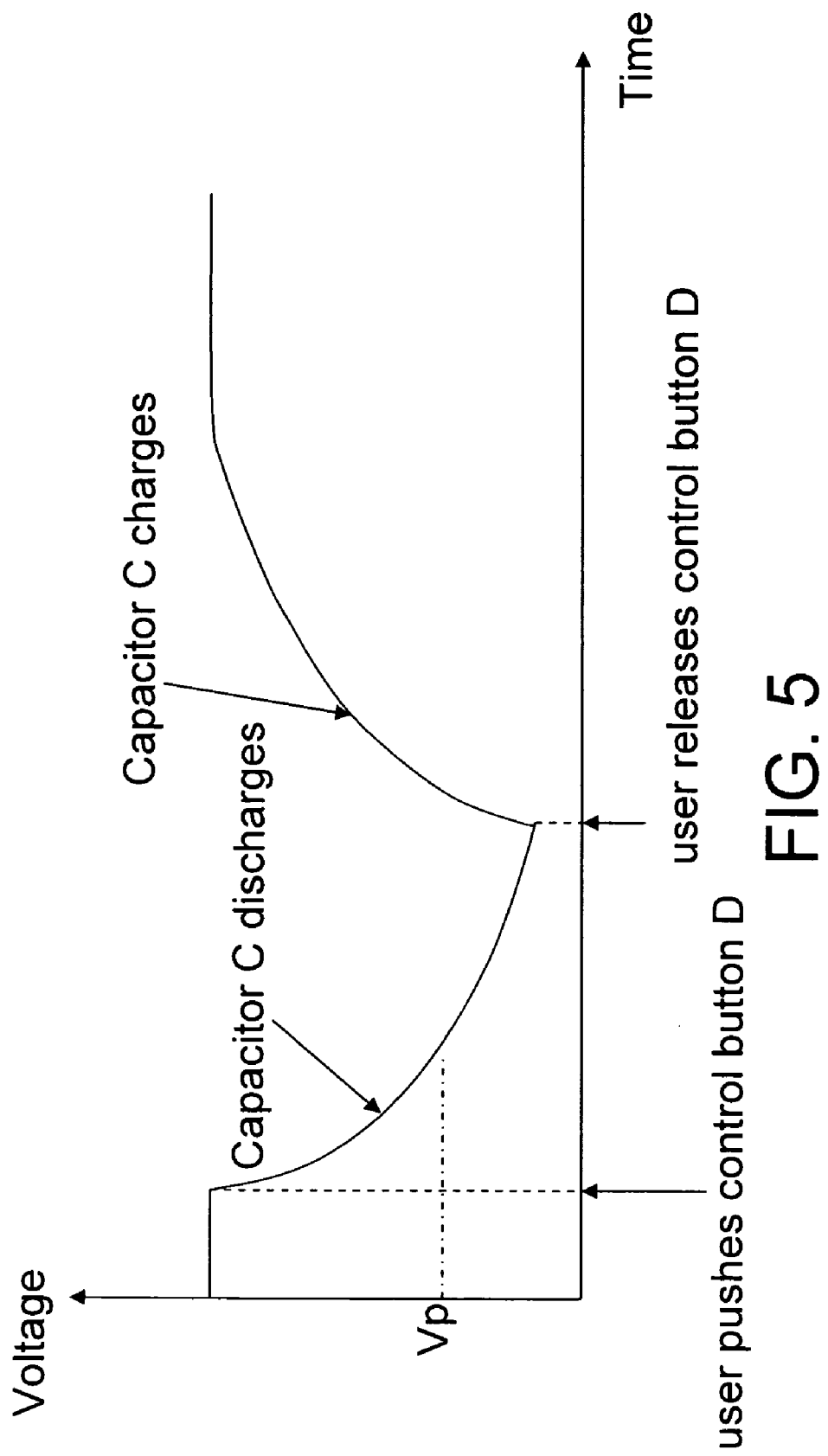

METHOD FOR CHANGING ACCESS SPEED OF AN OPTICAL DISK DRIVE

BACKGROUND OF THE INVENTION

1. Field of Invention

The invention relates to a method for changing the access speed of an optical disk drive, and especially a method that presses an existing button on the optical disk drive panel to achieve the goal of changing the optical disk drive access speed.

2. Related Art

Optical disks are currently the most cost effective and efficient data information storing media. From the traditional CD-ROM to the newer DVD-ROM, optical disk drives are now the most important standard component of personal and business computers.

In the future, as the Internet and multimedia industry grows, mid and low priced computers will become more widespread, and with the convenience and economical advantages brought by optical disks, the optical disk drive market will grow even bigger. By analyzing the development trend, DVD products are on their way to replacing CD products. The global optical disk drive industries are growing steadily, and DVD products are going to take over as the main-stream market.

By studying the development of the CD-ROM, it is clear that the goals for manufacturers have been faster speed. As an optic disk drive rotates at high speed, the centripetal force causes large vibrations and the mechanical structure of the optical disk drive becomes unstable. This affects the accuracy of data reading and generates a large amount of noise.

To solve the problems caused by operating the optical disk drive at high speed, the method of controlling optical disk drive speed disclosed by U.S. Pat. No. 6,512,725 sets the speed at two different patterns, one at low spinning speed, and the other at high spinning speed.

When a user needs to change the spinning speed of the optical disk drive from low spinning speed to high spinning speed, he or she needs to continuously press down on the eject button. This resets the optical disk drive timer back to zero so it starts timing. When the timer runs for over five seconds, it drives the motor in the optical disk drive and changes the spinning speed to high. Therefore, user can change the access speed of the optical disk drive according to different needs and lower the electricity and noise produced by optical disk drive operation.

This method of varying the optical disk drive access speed requires a set of timers to achieve the speed change of the disk drive.

In U.S. patent application number US2003/0007429A1, two controls buttons on the optical disk drive (play, pause, fast forward, fast rewind, etc), need to be pressed at the same time to change the speed. However, if the user does not press two buttons at the same time, but only one button, the function of the button is executed instead of speed change, so it is very inconvenient.

SUMMARY OF THE INVENTION

To solve the problems with the known technology, the invention discloses a method for changing access speed of an optical disk drive by placing an RC circuit between a control circuit and any one of the buttons (control button) on the optical disk drive panel. When the user presses down the control button continuously, the RC circuit sets the first input voltage of the control circuit to low. When the control circuit detects that the first input port voltage has lowered below a predetermined threshold, the control circuit drives the optical disk drive motor to changes the working speed.

Varying the optical disk drive access speed includes changing the access speed of the drive from low speed to high speed (for example, for 40× to 52×), from high speed to low speed (for example, from 52×, to 40×), or adjusting between different speeds due to individual needs.

The control button uses one of the existing buttons on the optical disk drive panel, which is a predefined button, as the control button for varying the disk reading speed. These buttons are: play, pause, next track, previous track, eject, etc.

This optical disk drive access speed varying method uses a simple RC circuit to allow the user to change the access speed of the disk drive, which reduces noise produced during the operation and the damage on the optical disks due to long periods of high speed spinning. It also increases the data transmission rate.

This method uses an existing button on the optical disk drive panel as the control button to vary the access speed of the drive, and does not change the design of the disk panel. Since only one set of RC circuits is needed to vary the access speed, it is very cost effective and thus increases the product's overall value.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 5 illustrates, in flow diagram form, the user pressing down the control button to vary the optical disk drive access speed.

DETAILED DESCRIPTION OF THE INVENTION

Figure 1:
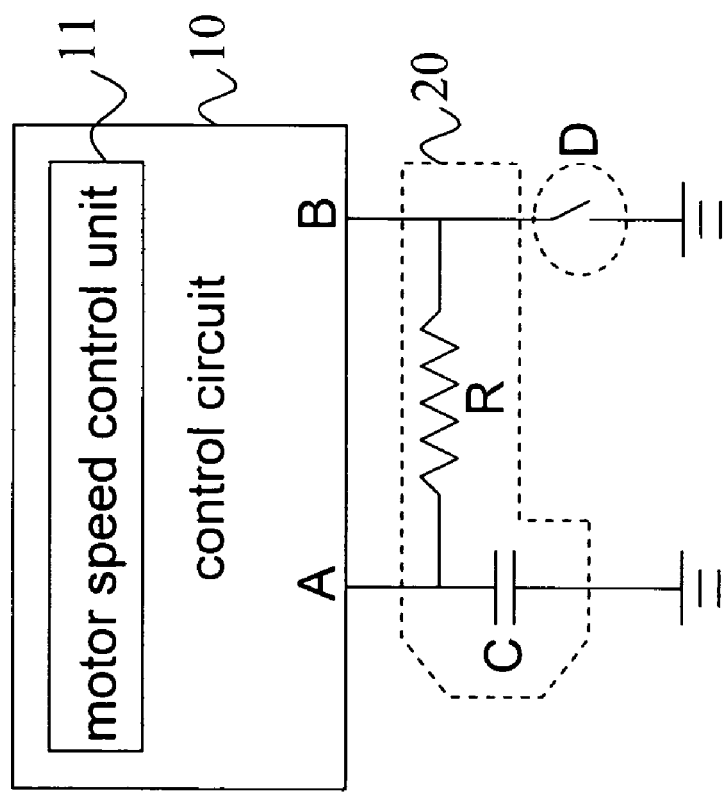
FIG. 1 illustrates the circuit diagram of the first embodiment for the method of varying the optical disk drive access speed.

Please refer to FIG. 1 for an illustration of the circuit diagram of the first embodiment of the method for changing access speed of an optical disk drive. The first embodiment uses any one of the buttons on the optical disk drive panel, such as: play, pause, fast forward, rewind, and retract, etc., as the control button for changing the access speed of the optical disk drive.

When a user wants to vary the access speed of the optical disk drive, the control button D needs to be pressed for a period of time to adjust the disk drive to a different speed, such as from low speed to high speed, or high speed to low speed.

The circuit diagram includes two major components, a control circuit 10 and a set of RC circuits 20. The control circuit 10 is comprised of a chipset, which includes a motor speed control unit 11, first input port A and second input port B.

The motor speed control unit 11 is connected to the motor of the optical disk drive, and is used to control the speed change of the motor.

The first input port A and second input port B in the control circuit 10 can detect digital signals that indicate high and low voltage. The first input port A is the control pin used to change the motor speed, and the first input port A is connected to a capacitor C and a resistor R. The other end of capacitor C is connected to the ground and the other end of resistor R is connected to the second input port B. The control button D, used to control the speed change of the optical disk drive, has one end connected to the second input port B and the other end connected to the ground.

Figure 2:
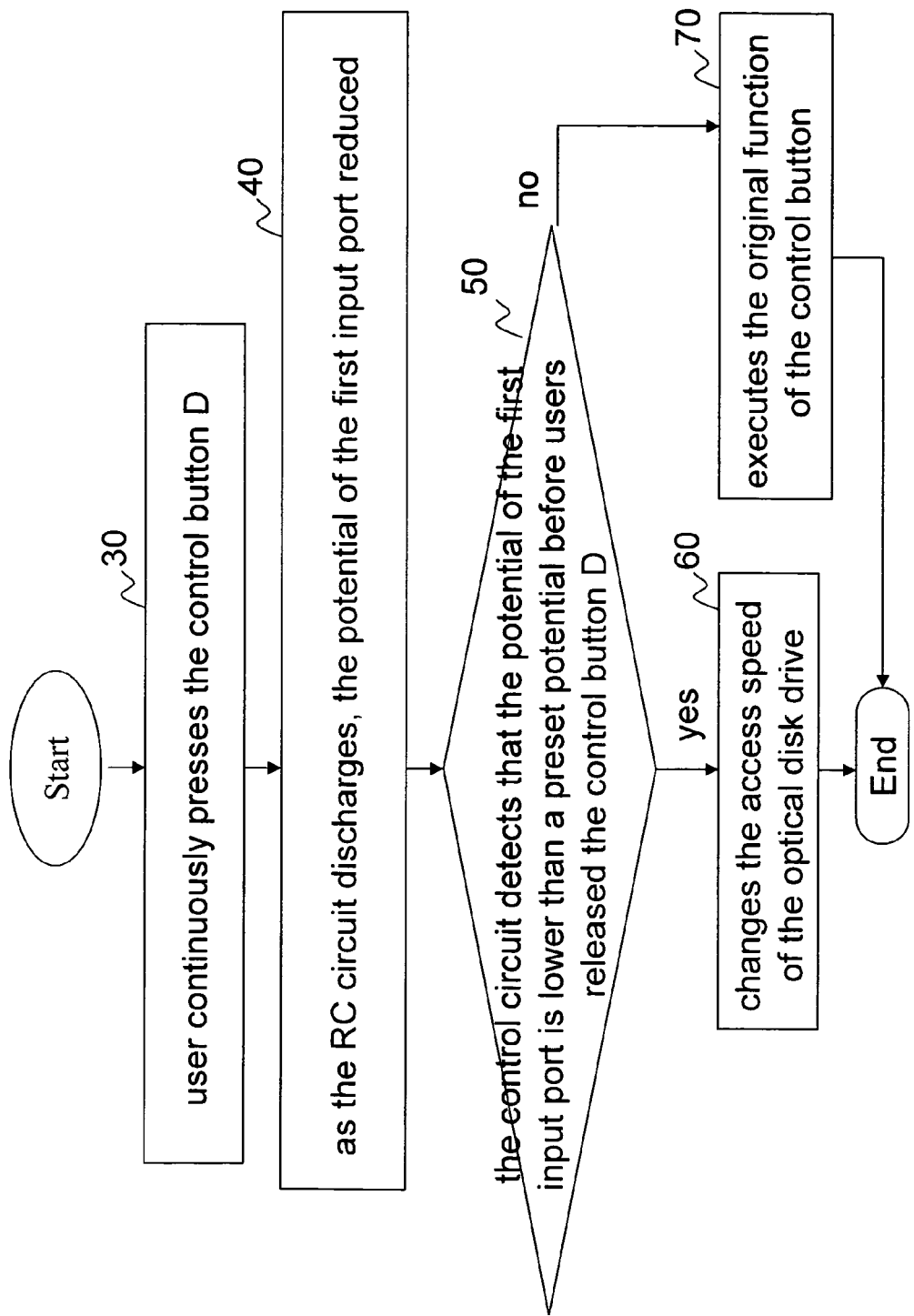
FIG. 2 illustrates the process of the capacitor releasing electricity.
Figure 3:
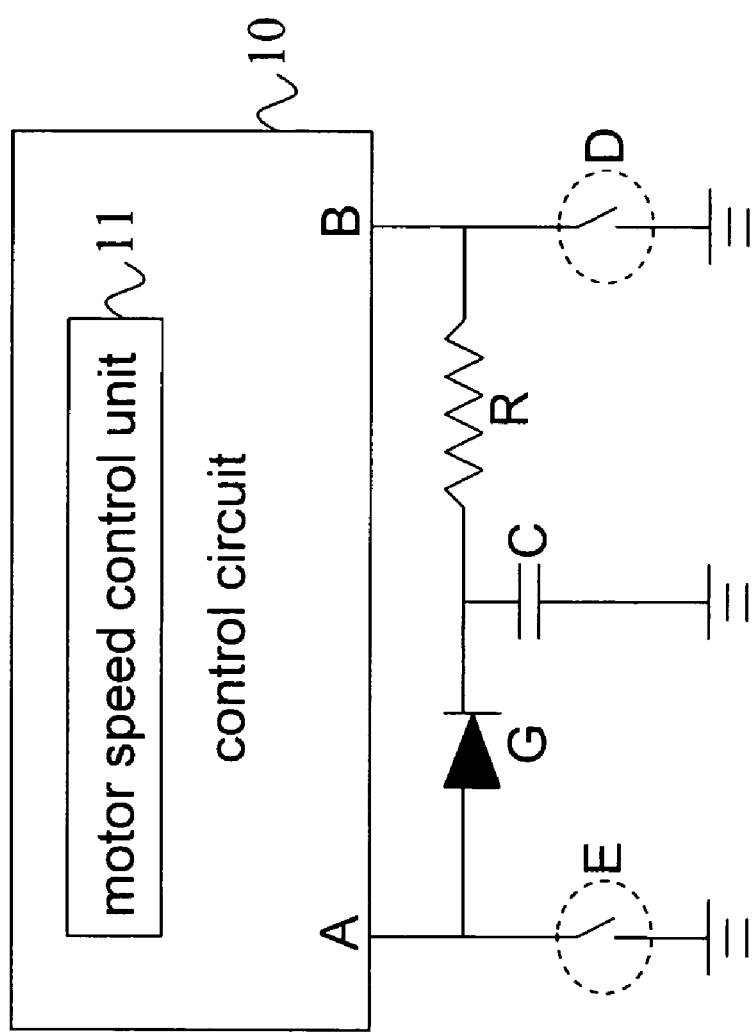
FIG. 3 illustrates, in flow diagram form, the first embodiment of the method of varying optical disk drive access speed.

Please refer to FIG. 2. As shown in the picture, when a user continuously presses down the control button D for a period of time, the originally disconnected control button D is connected and the stored electrical energy in the capacitor C is released through resistor R, so the voltages of the first input port A and the second input port B are decreased (from high voltage to low voltage). When detecting that the voltage of the first input port A has decreased below a predetermined threshold (Vp), the control circuit 10 drives the motor speed controlling unit 11 to execute adjustments to a different speed. On the other hand, if the user does not continuously press down on the control button D and releases it, the control circuit 10 detects the first input port A at high voltage, and executes the original function of control button D.

For example, the original access speed of the optical disk drive is 40×. If a user wants to increase the access speed to 52×, the control button D (for example, the eject button) needs to be continuously pressed. As the RC circuit conducts electricity, the voltage of the first input port A is decreased. When the voltage is detected to be decreased beyond a predetermined threshold Vp, the control circuit 10 drives the motor speed control unit 11 to increase the speed of the motor for the optical disk drive to 52×. On the other hand, if the user releases the control button D (for example: the eject button) and the control circuit 10 detects that the input voltage of first input port A is higher than the predetermined threshold Vp, the control circuit 10 executes the original function of ejecting the optical disk.

When the user releases control button D, the capacitor C is charged by an external power source to return to the original electrical potential level.

Please refer to FIG. 2 for an illustration of the flow diagram for the first embodiment of increasing the speed of the optical disk drive. Please refer to FIG. 1 for a diagram of the electrical circuit structure mentioned here.

First, user continuously presses the control button D (step 30). After a period of time, as the RC circuit discharged, the potential of the first input port reduced (step 40). Due to the continuous pressing of the control button D, the originally disconnected circuit is now connected and the capacitor C with high voltage starts releasing electricity.

After the capacitor C discharged for a period of time, the control circuit detects that the potential of the first input port is lower than a preset potential before users released the control button D (step 50), and then changes the access speed of the optical disk drive (step 60). On the other hand, if the control circuit 10 determines that the voltage of the first input port A is not lower than the predetermined threshold, it executes the original function of the control button (step 70).

Figure 4:
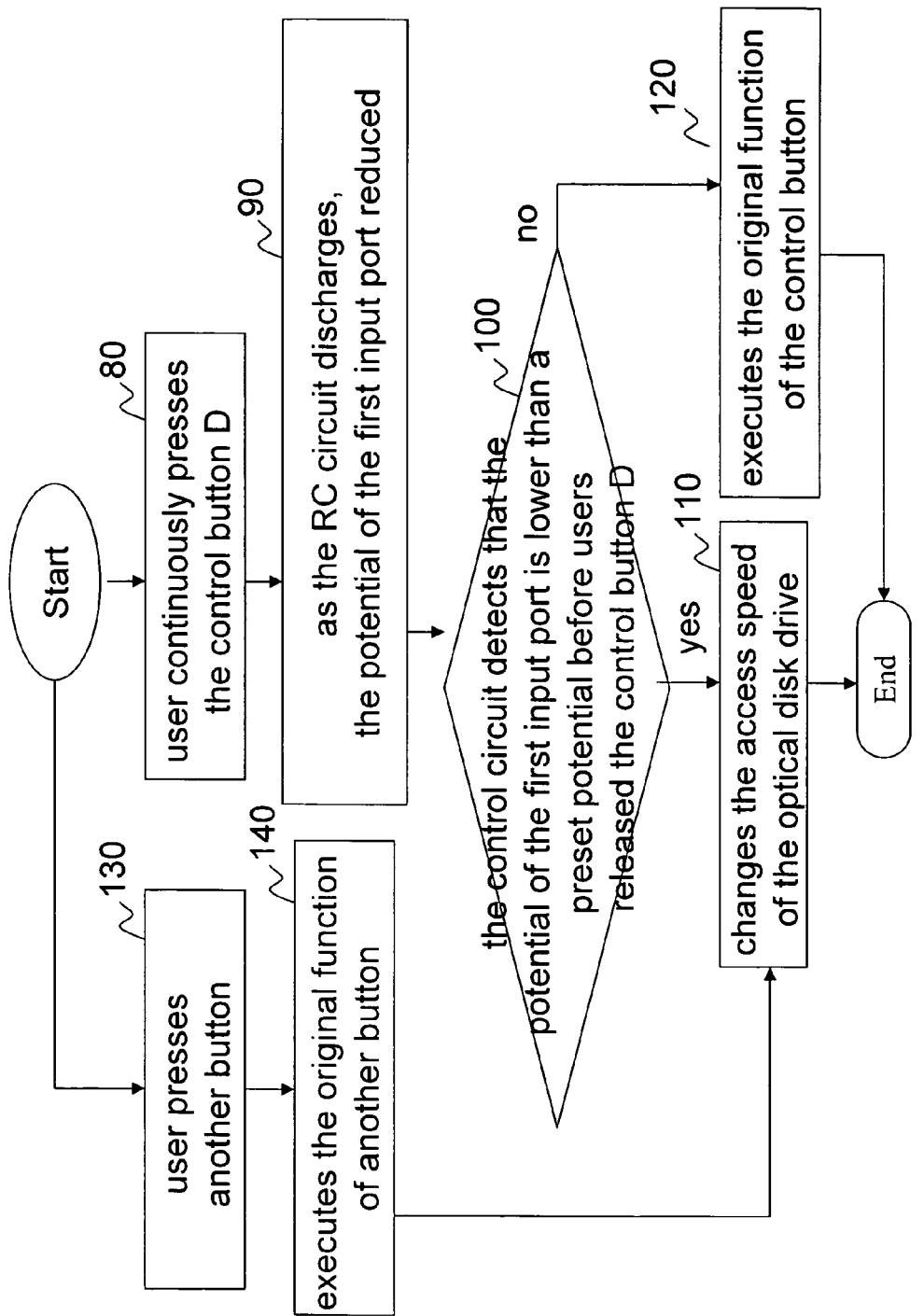
FIG. 4 illustrates the circuit diagram of the second embodiment for the method of varying the optical disk drive access speed.

Please refer to FIG. 4 for an illustration of the circuit diagram of the second embodiment of the invention. The second embodiment is basically identical to the first example, which has the second input port B connected to control button D. However, the first input port A in this example, which is used to control the motor speed, can use any of the buttons E on the optical disk drive panel and it is connected to the p-type end of the diode G. The n-type end of the diode G is connected to a capacitor C and a resistor R. The other side of the capacitor is connected to the ground and the other side of the resistor is connected to the second input port B.

Therefore, when a user presses down on a button E, since it is blocked by the diode G, it does not influence the functionality of the control button D, and executes its original function.

When user continuously presses down on the control button D for a period of time, through the diode G conducting electricity and the RC circuit releasing electricity, it decreases the voltages of the first input port A and the second input port B (from high voltage to low voltage). Before the user releases the control button D, the control circuit 10 detects that the voltage of the first input port A has decreased beyond a predetermined threshold Vp, and the control circuit 10 drives the optical disk drive motor to change the access speed of the optical disk, from low speed to high speed, or from high speed to low speed. On the other hand, before the user releases the control button D, the control circuit 10 detects that the voltage of first input port A is high, and executes the original function of the control button D.

Please refer to FIG. 5 for a flow chart of varying the optical disk drive access speed as the user presses down on the control button D. The electrical circuit structural diagram is illustrated by FIG. 4.

If the user continuously presses the control button D (step 80), after a period of time, as the RC circuit discharges, the potential of the first input port reduced (step 90), due to the continuous pressing down on the control button D, the originally discontinued circuit is connected, and the originally high voltage capacitor C starts to release electricity.

As the capacitor C releases electricity for a period of time, the control circuit detects that the potential of the first input port is lower than a preset potential before users released the control button D (step 100), the control circuit changes the access speed of the optical disk drive (step 110). On the other hand, if the control circuit detects that the voltage of the first input port A is not lowered beyond the predetermined threshold, it executes the original function of the control button (step 120).

If the user presses another button E (step 130), as the button E conducts, the diode E is in the state of revised biased and does not conduct electricity. Therefore, the voltage of the first input port A is zero, and the second input port B does not change. The control circuit 10 only executes the original function of the button E (step 140).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for changing access speed of an optical disk drive having a first input port of a control circuit for changing the access speed of a motor and any button of the optical disk drive being coupled with a RC circuit, by controlling the button to change the potential of the first input port, to drive the motor to change the access speed of the optical disk drive, comprising the following steps: (a) pressing the button continuously; (b) reducing the potential of the first input port by discharge of the RC circuit; and (c) changing the access speed of the optical disk drive when the control circuit detects the potential of the first input port is lower than a preset potential,
  wherein the button is selected from the group consisting of play, pause, fast forward, and rewind,
  wherein the first input port is coupled with an input port of another button of the optical disk drive panel, and the another button is connected to the second input port of the control circuit.

2. The method for changing access speed of an optical disk drive as claimed in claim 1, wherein said first input port is connected to the p-type end of a diode, the n-type end of the diode is connected to a capacitor and a resistor, the other end of the capacitor is connected to ground, and the other end of the resistor is connected to the second input port.

3. A method for changing an access speed of an optical disk drive, comprising:
  providing a first input port of a control circuit for changing the access speed of a motor, a RG circuit connected to the control circuit, and a button of the optical disk drive connected to the RC circuit;
  pressing the button to change the potential of the first input port; and
  driving the motor to change the access speed of the optical disk drive,
  wherein the button is selected from the group consisting of play, pause, fast forward, and rewind,
  wherein the first input port is coupled with an input port of another button of the optical disk drive panel, and the another button is connected to the second input port of the control circuit.

4. The method for changing the access speed of an optical disk drive as claimed in claim 3, wherein said first input port is connected to the p-type end of a diode, the n-type end of the diode is connected to a capacitor and a resistor, the other end of the capacitor is connected to ground, and the other end of the resistor is connected to the second input port.

* * * * *